United States Patent
Stählin et al.

(10) Patent No.: US 8,583,341 B2
(45) Date of Patent: Nov. 12, 2013

(54) METHOD FOR THE OPEN-LOOP AND CLOSED-LOOP CONTROL OF TRAFFIC FLOW

(75) Inventors: Ulrich Stählin, Eschborn (DE); Adam Swoboda, Groβ-Gerau (DE); Thomas Grotendorst, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 442 days.

(21) Appl. No.: 12/867,089

(22) PCT Filed: Feb. 11, 2009

(86) PCT No.: PCT/EP2009/051584
§ 371 (c)(1),
(2), (4) Date: Oct. 8, 2010

(87) PCT Pub. No.: WO2009/101114
PCT Pub. Date: Aug. 20, 2009

(65) Prior Publication Data
US 2011/0022247 A1    Jan. 27, 2011

(51) Int. Cl.
*B60T 7/12* (2006.01)
(52) U.S. Cl.
USPC .......................................................... 701/75
(58) Field of Classification Search
None
See application file for complete search history.

(56) References Cited

U.S. PATENT DOCUMENTS

| | | |
|---|---|---|
| 4,349,823 A | 9/1982 | Tagami et al. |
| 5,331,561 A | 7/1994 | Barrett et al. |
| 5,689,422 A | 11/1997 | Heymann et al. |
| 5,938,714 A | 8/1999 | Satonaka |
| 6,038,496 A | 3/2000 | Dobler et al. |
| 6,233,515 B1 | 5/2001 | Engelman et al. |
| 6,405,132 B1 | 6/2002 | Breed et al. |
| 7,109,854 B2 | 9/2006 | Dobler et al. |
| 7,212,906 B2 | 5/2007 | Arai et al |
| 2003/0120414 A1 | 6/2003 | Matsumoto et al. |
| 2004/0158366 A1* | 8/2004 | Dieterle .......................... 701/23 |
| 2007/0124027 A1* | 5/2007 | Betzitza et al. ................... 701/1 |
| 2007/0203617 A1 | 8/2007 | Haug |
| 2008/0024353 A1* | 1/2008 | Schneider ...................... 342/70 |

(Continued)

FOREIGN PATENT DOCUMENTS

| | | |
|---|---|---|
| DE | 3028077 | 2/1981 |
| DE | 195 07 957 C1 | 9/1996 |

(Continued)

OTHER PUBLICATIONS

Weidong Xiang, Paul Richardson and Jinhua Guo, Introduction and Preliminary Experimental Results of Wireless Access for Vehicular Environments (WAVE) Systems, IEEE Xplore, Nov. 20, 2009.

*Primary Examiner* — Thomas Tarcza
*Assistant Examiner* — Adam Alharbi
(74) *Attorney, Agent, or Firm* — RatnerPrestia

(57) ABSTRACT

A method for the open-loop and closed-loop control of traffic flow by means of the automatic takeover of the longitudinal control a vehicle by a driver assistance system. First, the method detects the occurrence of a special situation. Then, a driver assistance system automatically takes over the longitudinal control of the vehicle. When the special situation ends, the driver regains the control over the vehicle, which he had before the activation of the driver assistance system.

6 Claims, 1 Drawing Sheet

(56) References Cited

U.S. PATENT DOCUMENTS

| | | |
|---|---|---|
| 2008/0065293 A1 | 3/2008 | Placke et al. |
| 2008/0162010 A1* | 7/2008 | Klotz et al. ............ 701/93 |
| 2008/0288162 A1* | 11/2008 | Theimer et al. ............ 701/117 |
| 2010/0094509 A1 | 4/2010 | Luke et al. |

FOREIGN PATENT DOCUMENTS

| | | |
|---|---|---|
| DE | 197 56 592 A1 | 7/1998 |
| DE | 198 21 163 A1 | 11/1999 |
| DE | 101 25 966 A1 | 5/2002 |
| DE | 101 28 792 A1 | 11/2002 |
| DE | 10 2004 062 833 A1 | 9/2005 |
| DE | 10 2004 051 963 | 5/2006 |
| DE | 10 2005 051 910 A1 | 9/2006 |
| DE | 10 2005 057 251 A1 | 6/2007 |
| DE | 10 2006 004 772 A1 | 8/2007 |
| EP | 1 569 183 A2 | 8/2005 |
| EP | 1 569 183 A3 | 8/2005 |
| WO | WO 2006/024185 A1 | 3/2006 |
| WO | WO 2008/043850 A1 | 4/2008 |

* cited by examiner

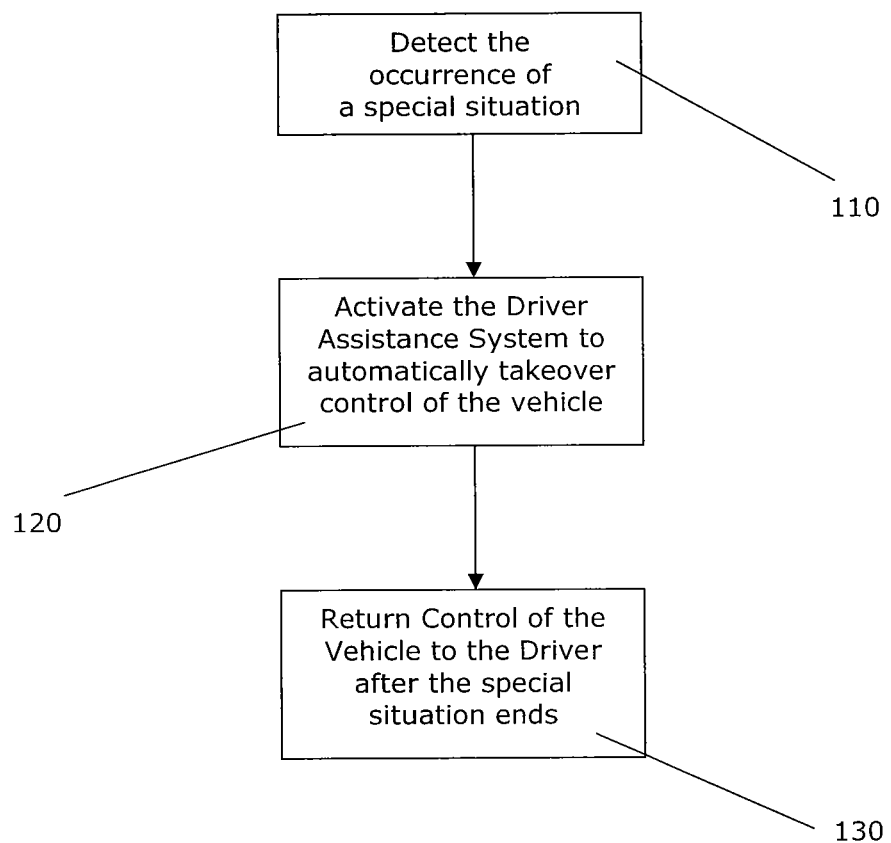

METHOD FOR THE OPEN-LOOP AND CLOSED-LOOP CONTROL OF TRAFFIC FLOW

CROSS REFERENCE TO RELATED APPLICATIONS

This application is the U.S. national phase application of PCT International Phase Application No. PCT/EP2009/051584, filed Feb. 11, 2009, which claims priority to German Patent application No. 10 2008 008 698.3, filed Feb. 11, 2008, and German Patent application No. 10 2009 008 403.7, filed Feb. 11, 2009, the contents of such applications being incorporated by reference herein.

FIELD OF THE INVENTION

The invention relates to a method for increasing the flow of traffic by means of the automatic takeover of the longitudinal control by a driver assistance system

BACKGROUND OF THE INVENTION

Various systems which assist the driver of a vehicle in keeping the vehicle in, for example, its lane, are known from the prior art. These systems are also referred to as LKS (Lane Keeping Support) systems. Known LKS systems comprise a lane detection system such as, for example, a video system with which the curvature of the lane and the relative position of the vehicle in the lane, the so-called attitude and orientation, can be determined. If the steering angle which is selected by the driver deviates too much from the setpoint steering angle which is predefined by the lane profile, artificial steering forces are applied to the steering of the vehicle using a steering actuator such as, for example, a servomotor. The steering forces are so strong that they can be detected haptically by the driver and indicate to the driver how he should activate the steering system in order to keep the vehicle in its lane.

The lane detection system can be implemented, for example, as a video system whose video signals are processed by signal processing software which supplies the desired geometric data (attitude, orientation, curvature of the lane). Other lane detection systems comprise for example a magnet sensor which determines the position of the vehicle in conjunction with magnets integrated in the roadway, or optionally also radar sensors. A reference steering angle, which would have to be set at the steering system in order to keep the vehicle in its lane in an optimum way, is then calculated from the geometric attitude data and information about the curvature of the lane by means of a mathematical reference model (algorithm). Given a deviation of the driver steering angle from the reference steering angle, an assistance torque is then applied to the steering system using a steering actuator. The assistance torque is calculated here on the basis of a predefined characteristic curve.

Distance sensors are known which indicate to the driver an object which is located in front of or behind the vehicle. Such sensors could also be used laterally on the vehicle. However, such sensors respond continuously if objects, in particular curbstones, are located to the side of the vehicle, even though there is no risk of running over said curbstones if the vehicle travels straight ahead. If a display or warning were to be output to the driver when there are such obstacles, the driver would lose his concentration and pose an additional risk to the traffic.

DE 101 25 966 A1, which is incorporated herein by reference, discloses a bend warning system for motor vehicles, in particular for long motor vehicles. A sensor device detects the steering angle of the front axle of the motor vehicle and, in the case of a plurality of steering axles, also their steering angles. A detection device detects obstacles in the lateral surroundings of the motor vehicle. If the detection device detects an obstacle, a calculation device calculates in advance, on the basis of the steering angle and of the velocity of the vehicle, whether a collision with the obstacle is imminent, and in the event of a risk of collision it generates a warning signal for the driver.

DE 30 28 077 C2, which is incorporated herein by reference, discloses a method for warning the driver of a vehicle about a vehicle traveling on the current lane of said first vehicle. In this context, by means of a radar device the traffic surroundings in front of the vehicle are monitored for the presence of a vehicle traveling in front, and the distance between the driver's own vehicle and a detected vehicle traveling in front, as well as the relative speed thereof, are determined. As a function of these parameters and the velocity of the driver's own vehicle and, if appropriate, further parameters such as the roadway and braking state, a safety distance between the two vehicles is calculated and is then compared with the measured distance. If the measured distance is shorter than the safety distance, a warning signal is generated, and the risk of a collision is displayed on a visual display field. In one variant of the known method, the sensing of surroundings is also extended to the respective area behind on adjacent lanes, so that the anticipated risk of an accident can also be determined in advance of a planned change of lane.

Document DE 195 07 957 C1, which is incorporated herein by reference, discloses a vehicle which is equipped with a system for warning against falling asleep. The vehicle has a laterally mounted optical scanning device for contactless detection of lane markings which laterally bound the vehicle's lane. The sensor data which are made available by the scanning device are fed to an evaluation unit for determining a distance between the vehicle and the detected lane markings. In addition, the evaluation unit determines the lateral speed of the vehicle in relation to the detected lane markings, wherein a warning against falling asleep in the form of an acoustic signal is triggered if it becomes apparent on the basis of the distance present and the lateral speed of the vehicle that exiting from the lane is imminent.

In order to prevent accidents which arise if the driver departs from the actual lane while driving, nowadays systems are used which warn drivers who are deviating from the lane (ASIL—Lane assistant in Citroen). These systems detect the lines on the surface of the road, whether discontinuous or continuous lines, and their colors and widths.

It is necessary in this context for the roads to be provided with lines such as is also prescribed by legislators since otherwise such lane assistants cannot be used. If the vehicle crosses such a line, for example without the activation of a flashing indicator signal, a warning signal is output by vibration of the seat. In this context, driver assistance systems are known such as, for example, an overtaking assistant, as well as the automatic takeover of a speed limiting means.

If a driver assistance system such as Adaptive Cruise Contron (ACC) is activated, the driver can increase the current speed by activating the accelerator pedal, without switching off the ACC function. However, the brake pedal causes the ACC to be switched off, in the same way as manual switching off. At present there is no possible way for the driver to be in command of the vehicle in free situations and allow himself to be led automatically by the ACC as soon as the driving possibilities are limited (and therefore also less fun).

SUMMARY OF THE INVENTION

An object of the present invention is to make available a longitudinal controller for a vehicle in such a way that reliable and economic control of a vehicle can be permitted with a driver assistance.

Driver assistance systems are implemented as electronic accessories in vehicles for assisting the driver in certain driving situations. In this context, there are often safety aspects, but predominantly the emphasis is on increasing driving comfort. These systems engage semi-autonomously or autonomously in the drive, control (for example throttle, brake) or signaling devices of the vehicle or warn the driver shortly before or during critical situations through suitable man/machine interfaces. Such driving assistance systems are, for example, a parking aid (sensor arrays for detection of obstacles and distances), brake assistant (BAS), cruise controller, adaptive cruise controller (ACC), distance warning, turning-off assistant, traffic jam assistant, lane-detection system, lane-keeping assistant/lane assistant (lateral control assistance, lane departure warning (LDW)), lane keeping support, lane change assistance, lane change support, intelligent speed adaptation (ISA), adaptive cornering light, tire pressure monitoring system, driver state detection means, road sign detection means, platooning system, automatic emergency braking system (ANB), full beam and dipped headlight assistant system for the headlights, night vision system.

One aspect of the present invention is that during and after the detection and occurrence of a special situation, a driver assistance system such as ACC automatically takes over the longitudinal control of the vehicle. When the situation is at an end, the driver regains the control which he had before the activation of the ACC. Special situations may be in this context be passing through speed-limited regions in the road traffic or intersections and traffic light systems. The enumeration is not to be considered to be restrictive. Special situations are to be understood as being all possible events which result in a change in the speed of the vehicle.

Another aspect of the present invention is the automatic takeover of the longitudinal control by driver assistance systems such as, for example, an ACC in special situations, with the return of the longitudinal control to the driver taking place after the end of the special situation, and the driver being provided with an intervention possibility as to whether the ACC is to take over in special situations.

A special situation may occur, for example, in the event of speed reductions in the road traffic when road signs on or along a road indicate the latter or construction conditions require such a speed reduction. Such special situations may occur on all categories of roads, and therefore on country tracks, country roads and federal roads as well as freeways. The road profile which is evaluated for the purpose of detection may occur within a locality or else cross country.

The detection of a special situation is carried out on the basis of an analysis of the safety systems installed in the vehicle.

Safety systems may be embodied as an electronic brake system (EBS), engine management system (EMS), anti-lock brake system (ABS), drive slip control system (DSCS), electronic stability program (ESP), electronic differential lock (EDL), traction control system (TCS), electronic braking force distribution system (EBFS) and/or engine torque control system (ETCS).

In order to increase safety in the event of a failure of the above, the detection system checks, for example, the functioning of the safety systems, and if a safety system which is to be actuated within the scope of the triggering of the driver assistance function is not operationally capable, said detection means accesses an alternative safety system.

BRIEF DESCRIPTION OF THE DRAWINGS

Further details of the invention are apparent from dependent claims in conjunction with the description and with reference to the drawing, in which:

FIG. 1 shows a flow chart diagram of an exemplary method of the present invention.

DETAILED DESCRIPTION OF THE INVENTION

In one embodiment, the open-loop and closed-loop control of the traffic flow is carried out by means of the automatic takeover of the longitudinal control by a driver assistance system, by virtue of the fact that, after the detection and the occurrence of a special situation, a driver assistance system automatically takes over the longitudinal control and/or lateral control of the vehicle, wherein, when the special situation ends, the driver regains the control over the vehicle, which he had before the activation of the driver assistance system.

Another embodiment is defined by the fact that the special situations are determined from digital map information and/or dynamic information and/or surroundings sensors and/or car-to-X communication and/or a mobile radio communication link, wherein the mobile radio communication link is implemented by means of 2G and/or 2.5G and/or 3G and/or 4G mobile radio networks.

Yet another embodiment of the method according to aspects of the invention, the detection of the special situation and the activation of the driver assistance system are carried out by means of a traffic light phase assistant and/or by means of an overtaking assistant.

Another embodiment is characterized by detection of the special situation and activation of the driver assistance system by a roadworks assistant.

In a first embodiment, as shown in FIG. 1, the method for the open-loop and closed-loop control of the traffic flow by means of the automatic takeover of the longitudinal control by a driver assistance system 120 is defined by the fact that, after the detection and the occurrence of a special situation 110, a driver assistance system automatically takes over the longitudinal control of the vehicle, wherein, when the special situation ends, the driver regains the control over the vehicle 130, which he had before the activation of the driver assistance system.

In another embodiment, the recommended speed is activated by a traffic light phase assistant for activating the ACC, which performs adjustment to the recommended speed. As soon as the vehicle passes the traffic light and crosses through it, the ACC is deactivated again.

In another embodiment of the invention, an overtaking assistant signals that for a certain time overtaking is not possible. The driver assistance system such as for example ACC, takes over the longitudinal control with, for example, the currently applicable speed limitation or reference speed and passes control back to the driver as soon as overtaking is possible again.

Another embodiment of the invention is defined by the fact that if the vehicle enters a zone with a speed limitation which deviates from the road type, due, for example, to a poor road surface on a freeway or roadworks, the driver assistance system takes over the longitudinal control for this route or section or driving area.

According to the aspects of the invention, special situations are detected, for example, from digital map information, dynamic information, surroundings sensors, car-to-X communication etc. The driver can set whether the automatic takeover is possible, possibly even individually for each function.

Instead of an ACC, a cruise controller or extensions of the ACC can also be used.

In addition to the longitudinal control, the method according to at least one aspect of the invention can also be used to activate the lateral control in a chronologically limited fashion. An example of this would be the activation of lane keeping at roadworks.

In another embodiment, the signals which are present in an ESP controller for the difference between yaw speeds or the steering angle signals with the image-generating distance signals of, for example, the radar scanner are evaluated together and when certain predefined setpoint values are exceeded or undershot by the additional evaluation of the distance signals which are acquired from the image detection and the point of interest (POI) which is determined therefrom, checking and plausibility testing is carried out between the setpoint course and the actual course of the vehicle, and these then permit the start of a special situation to be detected.

The invention claimed is:

1. A method for the open-loop and closed-loop control of traffic flow by way of the automatic takeover of at least one of a longitudinal and a lateral control of a vehicle by a driver assistance system in the vehicle, comprising:
   detecting an occurrence of a special situation when the driver assistance system is deactivated and the at least one of the longitudinal and the lateral control is being manually controlled by a driver of the vehicle;
   automatically activating the driver assistance system to take over the at least one of the longitudinal and the lateral control of the vehicle in response to detecting the occurrence of the special condition; and
   automatically deactivating the driver assisatance system in response to detecting that the special situation has ended such that the driver regains the manual control over the at least one of the longitudinal and the lateral control of the vehicle.

2. The method as claimed according to claim 1, wherein the special situations are determined from digital map information and/or dynamic information and/or surroundings sensors and/or car-to-X communication and/or a mobile radio communication link.

3. The method as claimed according to claim 2, wherein a mobile radio communication link is implemented by means of 2G and/or 2.5G and/or 3G and/or 4G mobile radio networks.

4. The method as claimed according to claim 1, wherein detecting the occurrence of a special situation and activating the driver assistance system are carried out by means of a traffic light phase assistant.

5. The method as claimed according to claim 1, wherein detecting the occurrence of a special situation and activating the driver assistance system are carried out by means of an overtaking assistant.

6. The method as claimed according to claim 1, wherein detecting the occurrence of a special situation and activating the driver assistance system are carried out by means of a roadworks assistant.

\* \* \* \* \*

UNITED STATES PATENT AND TRADEMARK OFFICE
CERTIFICATE OF CORRECTION

| | | |
|---|---|---|
| PATENT NO. | : 8,583,341 B2 | Page 1 of 1 |
| APPLICATION NO. | : 12/867089 | |
| DATED | : November 12, 2013 | |
| INVENTOR(S) | : Ulrich Stahlin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this
Tenth Day of February, 2015

Michelle K. Lee
*Deputy Director of the United States Patent and Trademark Office*